(12) United States Patent
Linnell et al.

(10) Patent No.: US 10,286,602 B1
(45) Date of Patent: *May 14, 2019

(54) FABRICATION BASEPLATE WITH ANCHOR CHANNELS

(71) Applicant: X Development LLC, Mountain View, CA (US)

(72) Inventors: Jeffrey Linnell, Woodside, CA (US); Brandon Kruysman, San Francisco, CA (US); Jonathan Proto, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,216

(22) Filed: Sep. 24, 2018

Related U.S. Application Data

(62) Division of application No. 14/577,572, filed on Dec. 19, 2014, now Pat. No. 10,118,343.

(51) Int. Cl.
   *B29C 64/20*      (2017.01)
   *B29C 64/245*     (2017.01)
   *B33Y 10/00*      (2015.01)
   *B33Y 30/00*      (2015.01)
   *B29L 31/00*      (2006.01)

(52) U.S. Cl.
   CPC ............ *B29C 64/20* (2017.08); *B29C 64/245* (2017.08); *B29L 2031/772* (2013.01); *B33Y 10/00* (2014.12); *B33Y 30/00* (2014.12)

(58) Field of Classification Search
   CPC .................................................. B29C 64/245
   See application file for complete search history.

(56) References Cited

U.S. PATENT DOCUMENTS

| | | |
|---|---|---|
| 6,482,576 B1 | 11/2002 | Farnworth |
| 2009/0184444 A1 | 7/2009 | Honda |
| 2009/0309267 A1 | 12/2009 | Boot |
| 2014/0197576 A1 | 7/2014 | Kraibuhler |

FOREIGN PATENT DOCUMENTS

| | | |
|---|---|---|
| CN | 100587591 C | 2/2010 |
| WO | WO-0140866 | 6/2001 |
| WO | WO 2011086450 | 7/2011 |
| WO | WO 2012171644 | 12/2012 |

*Primary Examiner* — Timothy Kennedy
(74) *Attorney, Agent, or Firm* — Fish & Richardson P.C.

(57) ABSTRACT

An example fabrication system includes a light source, a resin container, and a base plate on which resin is cured using the light source so as to build up an object one layer at a time. The disclosed base plate includes a build surface and an anchor channel that extends into the base plate from the build surface. The anchor channel is a recess in the base plate configured to have a narrow width that is closer to an opening to the build surface than a broad width. The base plate can also have a light source that emits light into the anchor channel to cure resin within the anchor channel. Resin anchors cured within the anchor channel to conform to the anchor channel resist being extracted, and an object formed on the build surface remains anchored during fabrication via adhesion to the resin anchors.

20 Claims, 12 Drawing Sheets

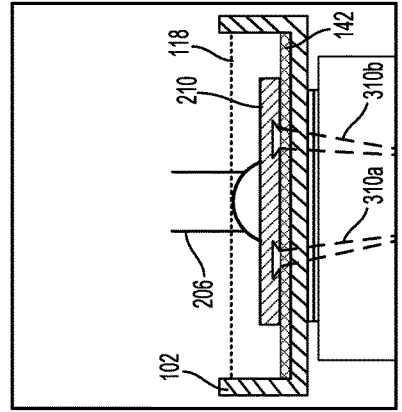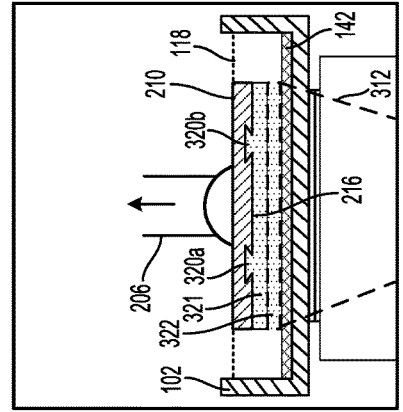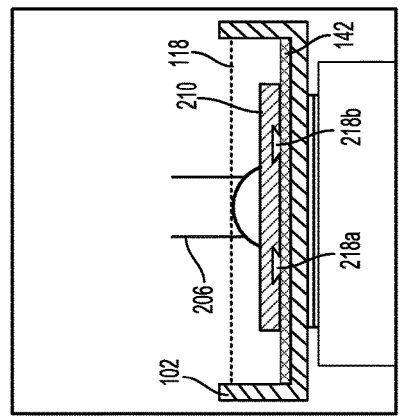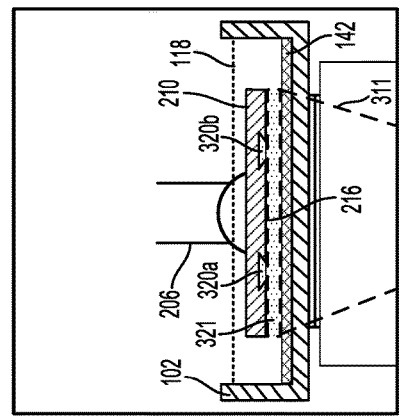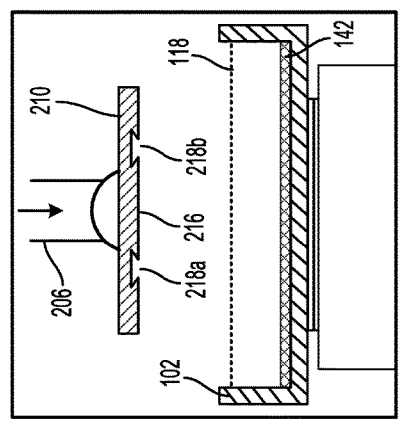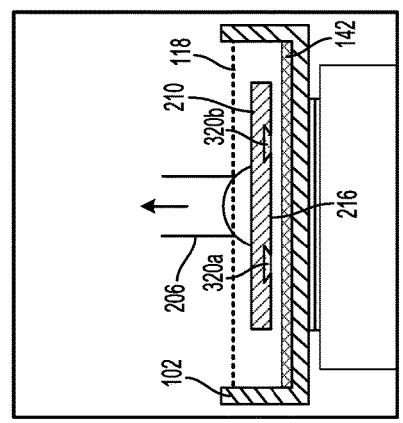

FABRICATION BASEPLATE WITH ANCHOR CHANNELS

CROSS-REFERENCE TO RELATED APPLICATION

This application is a divisional of U.S. application Ser. No. 14/577,572, filed Dec. 19, 2014, the contents of which are incorporated by reference herein.

BACKGROUND

Three-Dimensional ("3D") printing is an additive manufacturing process in which successive layers of material are formed over one another to form a 3D object. Each layer adheres to the layer below to create an integrally formed object. Various types of 3D printing process have been developed, including extrusion-based 3D printing (e.g., fused deposition modeling (FDM)), and processes based on light polymerization, such as stereolithography (SLA) and digital light processing (DLP), among others.

In stereolithography processes, a 3D structure is built up one layer at a time. Each layer is formed by exposing a photo-reactive resin to an ultraviolet (UV) light source that cures the resin. Note that stereolithography may also be referred to as optical fabrication, photo-solidification, and/or solid free-form fabrication and solid imaging.

In a typical stereolithography process, a digital 3D model of an object is created by a user using a software application that interfaces with the 3D printing system. The application determines a set of layers that correspond to the object. The layers can be determined by thin slices through the 3D model with a set of horizontal planes. Each slice of the 3D model can then be converted to a two-dimensional mask pattern, such that the 3D model is represented as a sequence of two-dimensional mask patterns, which each outline the shape of the corresponding layer from the 3D model. The mask patterns can be sequentially projected onto a photo-reactive liquid or powder resin surface while the resin is illuminated with UV light to cure the resin not shielded by the mask in the shape of the corresponding layer. Alternatively, instead of using masks, each slice of the 3D model may be representing by a two-dimensional pattern in the shape of the slice, so that a projector or other imaging system can illuminate a sequence of such patterns onto the resin to form the object.

SUMMARY

An example fabrication system includes a light source, a resin container, and a base plate on which resin is cured using the light source so as to build up an object one layer at a time. The disclosed base plate includes a build surface and a mortise, which is also referred to as an anchor channel, that extends into the base plate from the build surface. The anchor channel is a recess in the base plate configured to have a narrow width that is closer to an opening to the build surface than a broad width. The base plate can also have a light source that emits light into the anchor channel to cure resin within the anchor channel. Resin anchors cured within the anchor channel to conform to the anchor channel resist being extracted, and an object formed on the build surface remains anchored during fabrication via adhesion to the resin anchors.

In one aspect, the present disclosure includes a fabrication system. The fabrication system can include a resin container, a base plate, one or more light sources, and a control system. The base plate can include a build surface and at least one anchor channel that extends into the base plate from the build surface. The at least one anchor channel can have at least a first portion with a narrow width that is closer to the build surface than a second portion with a broad width which is greater than the narrow width. The base plate can be moveable with respect to the resin container. The one or more light sources can be operable to: (i) emit light toward the resin container so as to illuminate and cure resin in the resin container, and (ii) emit light into the at least one anchor channel so as to illuminate and cure resin in the at least one anchor channel. The control system can be configured to receive data indicative of a three-dimensional object. The control system can also be configured to control the one or more light sources to cure at least one resin anchor within the at least one anchor channel. The control system can also be configured to operate the one or more light sources to form the indicated three-dimensional object from multiple layers of cured resin based at least in part on the received data. Each of the multiple layers can be formed by curing a layer of resin at a printing interface within the resin container. A first-formed one of the multiple layers can be formed at least partially on the build surface of the base plate and can adhere to the at least one resin anchor.

In another aspect, the present disclosure includes an apparatus. The apparatus can include a base plate and one or more light sources. The base plate can include a build surface and at least one anchor channel that extends into the base plate from the build surface. The at least one anchor channel can have at least a first portion with a narrow width that is closer to the build surface than a second portion with a broad width which is greater than the narrow width. The one or more light sources can be operable to emit light into the at least one anchor channel so as to illuminate and cure resin in the at least one anchor channel.

In another aspect, the present disclosure includes a method. The method can include at least partially submerging a base plate in resin within a resin container such that resin within the resin container enters at least one anchor channel of the base plate. The base plate can include a build surface and the least one anchor channel that extends into the base plate from the build surface. The at least one anchor channel can have at least a first portion with a narrow width that is closer to the build surface than a second portion with a broad width which is greater than the narrow width. The method can also include operating one or more light sources to emit light into the at least one anchor channel while the resin occupies at least a portion of the at least one anchor channel to cure at least one resin anchor within the at least one anchor channel. The method can also include operating the one or more light sources to form a first layer that is formed at least partially on the build surface of the base plate and adheres to the at least one resin anchor.

In yet another aspect, the present disclosure includes means for at least partially submerging a base plate in resin within a resin container such that resin within the resin container enters at least one anchor channel of the base plate. The present disclosure includes means for operating one or more light sources to emit light into the at least one anchor channel while the resin occupies at least a portion of the at least one anchor channel to cure at least one resin anchor within the at least one anchor channel. The present disclosure includes means for operating the one or more light sources to form a first layer that is formed at least partially on the build surface of the base plate and adheres to the at least one resin anchor.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 3A, 3B, 3C, 3D, 3E, and 3F illustrates stages of fabricating an object from multiple layers using an example 3D printer system having anchor channels, according to an example embodiment.

DETAILED DESCRIPTION

Figure 1A:
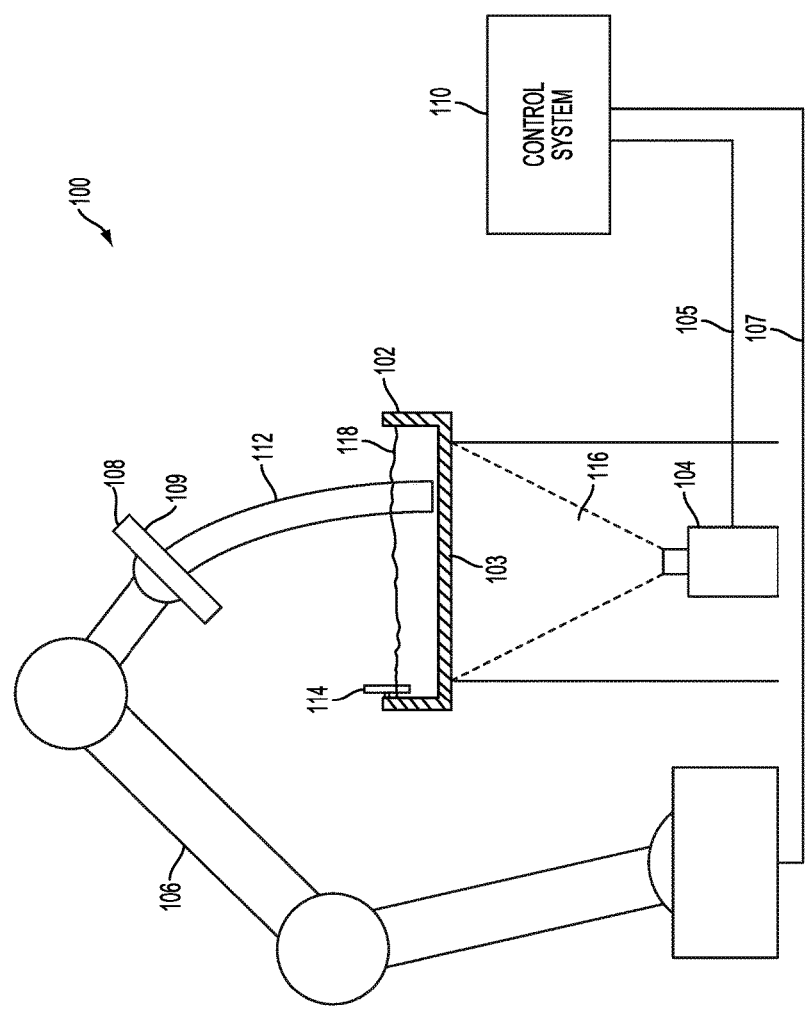
FIG. 1A shows a 3D printer system, according to an example embodiment.

The following detailed description describes various features and functions of the disclosure with reference to the accompanying Figures. In the Figures, similar symbols typically identify similar components, unless context dictates otherwise. The illustrative apparatuses described herein are not meant to be limiting. It will be readily understood that certain aspects of the disclosure can be arranged and combined in a wide variety of different configurations, all of which are contemplated herein.

I. Overview

A 3D printing system can include a resin container holding photo-reactive resin and a light source. The light source can emit light that cures the resin. The light source may be situated below the resin container, and the resin container can have a partially transparent bottom that the resin-curing light passes through. A base plate can be mounted to a robotic arm. During fabrication of a 3D object, the base plate may be initially submerged within the resin by positioning the base plate along the bottom surface of the resin container, but with enough separation to allow light transmitted through the bottom surface to cure a layer of resin disposed on the base plate. The light transmitted to the resin can be patterned to correspond with a shape of the first layer such that the cured resin forms the first layer on the base plate. The base plate can then be raised, away from the bottom of the resin container, and another layer can be formed over the first layer. The cured layers of resin adhere to one another and to the base plate, which moves away from the bottom surface following the formation of each layer such that the most recently formed layer is separated from the bottom surface by enough space to make room for the next layer. As such, the 3D object can be formed, layer by layer.

The light source may be associated with one or more lenses and/or mirrors used to direct the light according to each particular layer-specific pattern. For example, the light source may include a UV laser and a pair of scanning mirrors configured to rotate about transverse axes that direct the laser light according to a layer-specific pattern. In another example, the light source may include an array of separately actuated mirrors that selectively direct light toward the bottom surface in a pixelated pattern. The resulting 3D structure is formed from a series of the laminated layers that hang from the base plate.

In some examples, the system may also allow for the base plate on which the initial layer is cured to be mounted on a robotic arm that can angle the base plate (and any partially fabricated structures formed thereon) with respect to the bottom surface of the resin container. As a result, at least some of the layers in the resulting structure may not be parallel with all other layers.

The present disclosure provides a base plate with improved adhesion to the cured layers of resin. The base plate includes one or more channels for anchoring the cured resin to the base plate during fabrication. The anchor channels may be recesses that extend into the base plate from the build surface on which the resin object is being formed. The anchor channel may take different shapes in order to anchor the resin structure to the base plate. During fabrication, prior to curing the first layer of an object, the anchor channels are at least partially filled by resin and the resin therein is cured to create resin anchors for the first layer to adhere to. Because the resin is cured within the anchor channels, the resin anchors have a shape that at least partially conforms to the shape of the anchor channels.

In some cases, the anchor channels are formed as recesses in the build surface of the base plate. The anchor channels have sidewalls that define the width of the anchor channels, and the anchor channels can be shaped such that a width of the anchor channel increases at greater depths. An anchor channel with a broad section at a greater depth than a narrow section is able to resist extraction of cured resin situated therein, because the surfaces of the cured resin that conform to the sidewalls in the broad section resist being extracted through the narrow section.

In some examples, the anchor channel may have a cross-sectional shape similar to a T-shape or a dovetail joint. For instance, a dovetail-shaped anchor channel may have sidewalls that are substantially planar and oriented with respect to one another such that the sidewalls are closer together near the opening to the build surface, than at a depth within the channel. The sidewalls of such a dovetail-shaped anchor channel may be oriented such that the width of the anchor channel (and the cross-sectional area of the anchor channel transverse to the depth of the anchor channel) increases monotonically with depth into the anchor channel (i.e., distance from the build surface). In another example, a T-shaped anchor channel can have a narrow section near the opening to the build surface, and a broad section at a greater depth within the anchor channel. In the narrow section, the distance across the anchor channel may be approximately the same as the distance across the opening to the build surface. In the broad section, the distance across the anchor channel can be greater than the width in the narrow section.

To secure 3D structures with the anchor channels, a 3D printing process begins by partially submerging the base plate into the resin, which causes resin to occupy the anchor channels. The resin in the channels is then cured by applying UV light to the channels. Light may be provided by the light source located beneath the resin container or by one or more additional light sources that emit light into the channels through the sidewalls and/or ends of the channels themselves. Using additional light sources to emit light directly into the channels may have an additional advantage that resin within the channels can be cured even without a direct line of sight to the light source situated below the resin container.

Once resin is cured within the channels, the first layer of the 3D object is formed on the build surface of the base plate, and subsequent layers are formed thereon. The first layer is partially disposed on the build surface, and also directly on the cured resin within the channels, which anchors the first layer to the resin cured within the channels. Upon completion of the 3D object, the entire object is separated from the base plate and the resin anchors (i.e., the cured resin that occupied the anchor channels) are removed. In some cases in which the anchor channels extend along the entire length of the base plate, the object may be removed from the base plate by sliding the resin anchors through the anchor channels, until the resin anchors have entirely exited the anchor channels.

II. Example 3D Printer Systems

FIG. 1A shows a 3D printer system 100 according to an example embodiment. The 3D printer system 100 includes a resin container 102, a light source 104, a base plate 108 mounted to a robotic arm 106, and a control system 110. The resin container 102 holds a photo-reactive resin 118. The light source 104 is arranged below the resin container 102. The light source 104 is operable to emit electromagnetic radiation 116 towards the resin container 102 in a controlled manner, such that the electromagnetic radiation 116 transmitted through a bottom 103 of the resin container 102 cures at least some of the resin 118 in the resin container 102 that is situated along the bottom 103. Thus, the bottom 103 of the resin container 102 is at least partially transparent to the electromagnetic radiation 116 emitted by the light source 104. The control system 110 generates control signals to cause the robotic arm 106 and the light source 104 to operate so as to fabricate a given object from sequentially formed layers of cured resin.

A. Robotic Arm

The robotic arm 106 is operable to position the base plate 108 above the resin container 102, and to move the base plate 108 with respect to the resin container 102 with at least two degrees of freedom. In some examples, the robotic arm 106 may include enough joints and/or actuators to move the base plate 108 with six degrees of freedom. As a result, the build volume of the 3D printer system 100 (i.e., the volume that may be occupied by an object being fabricated) may extend beyond the edges of the resin container 102.

In an example, the robotic arm 106 may be an articulated robot with three rotary joints, allowing the robotic arm 106 six degrees of freedom. However, more or less rotary joints are possible. Further, the 3D printer system 100 can mount the base plate 108 to various types of robotic devices, and is not limited to robotic arms. For example, the base plate 108 could be mounted to a two-axis head unit, or a robotic arm having four degrees of freedom. Other examples are also possible in which the base plate 108, resin container 102, and/or light source 104 are mounted such that the position at which a next layer is formed can be moved with respect to a previous layer. For instance, robotic arm 106 may be programmable and a set of control instructions can be generated via the control system 110 to move the robotic arm 106 in a manner that results in creation of a particular object 112 on base plate 108.

B. Base Plate

The base plate 108 may vary in size and/or shape, depending upon a particular application and/or other factors (e.g., ease of manufacture, cost). Further, the base plate 108 may be formed from various materials or combinations of materials. The base plate 108 includes a build surface 109 that faces the resin container 102 and provides a platform for fabricating the object 112. The build surface 109 of the base plate 108 may be formed from any material to which a layer of resin will adhere when cured. Further, because the base plate 108 holds the object 112 being printed from above, the size, the weight distribution, the shape, and/or the adhesive properties of the build surface 109 and/or base plate 108, may be designed so as to provide support for certain loads (e.g., so that the base plate 108 can hold objects up to a certain weight, shape, and/or size).

In some examples, the base plate 108 may be implemented as an end effector on robotic arm 106. In some examples, the base plate 108 may be implemented as a structure that is mounted to an end effector of robotic arm 106. The base plate 108 may therefore include mounting features on a side opposite the build surface to allow the robotic arm 106 to be releasably mounted to the base plate 108. In some applications, the base plate 108 may additionally include electrical connections that mate with corresponding connectors on the robotic arm 106 to facilitate power and/or data connections between the base plate and the control system 110. For instance, the base plate 108 may include one or more sensors that detect a current loading condition of the base plate 108, an amount of structural deformation of the build surface 109, and/or other factors related to fabrication of the object 112 and/or operation of the 3D printing system 100, and data from such sensors may be sent to the control system 110 for monitoring.

C. Resin Container

The resin container 102 may be of various sizes and/or shapes, depending upon particular applications and/or other factors. Further, the bottom 103 of the resin container 102 may be formed from any material that allows for at least partial transmission of electromagnetic radiation from the appropriate region of the electromagnetic spectrum for curing the resin 118. Thus, the electromagnetic radiation 116 emitted by light source 104 can pass through the bottom 103 of the resin container 102 to cure at least some of the resin 118 which is disposed along the bottom 103 in the interior of the resin container 102. For example, if resin 118 is an ultraviolet-curable photopolymer, then the bottom 103 may be formed from any material that ultraviolet radiation can pass through. Other examples are possible.

In addition, the bottom 103 may include a material along the interior of the resin container 102 that resists adhesion with cured resin. Additionally or alternatively, a coating or a film of adhesion-resistant material may be applied to the interior of the bottom 103. Because the object 112 is formed layer by layer, and each layer is formed from resin disposed along the bottom 103 of the resin container 102, each freshly-cured layer of resin is separated from the interior of the bottom 103 before the next layer is cured. Thus, selecting a material and/or coating that resists adhering to cured resin is desirable.

Further, note that example embodiments are not limited to the stereolithography techniques described herein. In some embodiments, a scanning laser could be used to cure the resin 118 instead of a UV light source. Further, various types of resins may be utilized, including liquid and powdered photo-curable resins. Other variations on the embodiments described herein are also possible.

D. Light Source

The light source 104 may take various forms, depending upon particular applications and/or other factors. The light source 104 may be any controllable light source that emits electromagnetic radiation from the appropriate region of the electromagnetic spectrum for curing the resin 118. In some examples, the light source 104 may be configured to emit radiation 116 (e.g., UV light) with a pattern that is shaped according to a particular layer (slice) of a 3D model, such that the resin in that shape disposed along the interior of the bottom 103 cures to form a corresponding layer of a 3D object. In some examples, the light source 104 could be, or include, a standard consumer projector without a UV filter. Other types of projectors are also possible.

To effect patterning of the emitted radiation 116 in accordance with a given layer, the light source 104 may include (or be associated with) various transmissive, reflective, and/or scanning technologies. For instance, the light source 104 may direct radiation to a screen that transmits or blocks radiation on a pixel-by-pixel basis and then projects the pixelated pattern toward the resin container 102 via an appropriate optical train. In some examples, a pixelated pattern of micro mirrors may alternatively be used to create a pixelated pattern of radiation that corresponds to a given layer, which can then be projected toward the resin container 102. Additionally or alternatively, a laser and two or more rotating mirrors can be used to scan a laser beam through a pattern that corresponds to a given layer.

E. Agitator

In some applications, it may be desirable to agitate the surface of the resin 118 during the 3D printing process. Specifically, agitating the surface of the resin 118 may improve the 3D printing process by improving the uniformity of the layers in the printed object 112. Thus, as shown in FIG. 1A, the printing system 100 may include a scraper 114 operable to move across the resin container 102, in order to agitate the surface of the resin 118.

For example, the scraper 114 may be operated to periodically agitate or "scrape" the surface of resin 118 during the process of 3D printing an object, such as after the formation of each layer, or according to some predetermined interval. In some implementations, the scraper 114 may be operated manually by a human. Additionally or alternatively, the scraper 114 may be automated (e.g., motorized), such that the control system 110 can automatically operate the scraper during the 3D printing process. For example, the control system 110 may automatically move the scraper across the resin container 102 after the curing of each layer is completed.

F. Build Volume

The build volume of an example system, such as 3D printer system 100, may be defined at least in part by the range of movement and/or the reach of the robotic arm 106 to which the base plate 108 is mounted. For example, in FIG. 1A, the build volume may be defined by the range of movement of the robotic arm 106. Other examples are possible.

Further, example embodiments, such as the 3D printer system 100, may allow for the creation of objects that are much larger than those that can be created in a 3D printer where the build volume is defined by the surface area of the resin container 102 and/or by the surface area of the base plate 108.

FIGS. 1C to 1F collectively illustrate movement of the robotic arm 106 during the process of 3D printing an arch-shaped object 112. More specifically, FIGS. 1C to 1F show the state of the arch-shaped object 112 at distinct stages of the 3D printing process, progressing chronologically beginning with FIG. 1C, then FIG. 1D, then FIG. 1E, then FIG. 1F. During this process, the robotic arm 106 moves the base plate 108 along a curvature 132, in order to create the arch-shaped object 112. Since the build volume is defined at least in part by the robotic arm's range of movement, the 3D printing system 100 is able to create the arch-shaped object 112 which extends well beyond the edges of the resin container 102.

Further, example embodiments, such as 3D printer system 100, may allow for creation of objects with non-parallel layers. Specifically, when the base plate 108 is mounted on a robotic device with two or more degrees of freedom, such as the robotic arm 106, the robotic device can vary pose of the base plate 108, and thus the pose of the in-progress object, with respect to the surface of the resin 118, such that at least some layers of the object 112 may be angled with respect to one another. For example, the angle of the base plate 108 may be changed at various stages during the 3D printing process shown in FIGS. 1C to 1F, such that at least some of the layers in the arch-shaped object 112 are wedge-shaped (e.g., have a non-uniform thickness).

Additionally, the 3D printer system 100 may allow for creation of objects with less support structures than would typically be used in other 3D printing techniques. For instance, structures such as arches or other features with an overhang would typically include supports. When support structures need to be removed after 3D printing an object, this can add time and/or manual labor to the process, and can result in imperfections at locations where supports are removed. Because the 3D printer system 100 allows for some layers to have non-uniform thicknesses, the arched structure 112 can be formed from a plurality of wedge-shaped layers, which is more structurally resilient than a structure formed from parallel uniform-thickness layers. Thus, 3D printer system 100 may allow for producing objects without additional supports and the resulting object may have smoother surfaces and be completed in less time, as compared to other types of 3D printers.

For example, in a system where the base plate 108 does not suspend the object 112 from above the resin container 102 using a robotic arm 106, fabricating an arch, or another object with an overhang, might require that supports be created for the arch or overhang during the 3D printing process (e.g., to support separate, disconnected portions of the arch until they are connected by subsequent layers). However, when the base plate suspends an object over the resin container, such as in 3D printer system 100, such supports may not be required.

In some cases, the ability to form non-parallel layers (e.g., wedge-shaped layers) may enable improved fabrication of curved objects, such as the arch-shaped object 112 shown in FIG. 1C to 1F. Additionally or alternatively, by changing the orientation of layers within a 3D printed object, it may be possible to intelligently control characteristics of the object such as structural rigidity, elasticity, etc. based on the orientation of the individual layers. Accordingly, 3D printer system 100 may allow for more flexibility in specifying the structural characteristics of an object being printed. For example, 3D printer system 100 may be used to create a more stable structure (e.g., a structure that can manage higher compression loads). Other examples are also possible.

G. Control System

Referring again to FIG. 1A, 3D printer system 100 also includes or is in communication with the control system 110. The control system 110 may take the form of or include executable program logic, which may be provided as part of or in conjunction with a 3D printer system 100. Such program logic may, upon execution, operate to generate control signals for one or more components of the 3D printer system 100 so as to cause the system 100 to fabricate a specified 3D object. For example, a number of program-logic modules may be included as part of the control system 110.

In an example operation, control system 110 may receive data indicating a 3D model of an object. The control system 110 may then generate control signals based at least in part on the 3D model indicated by the received data. The control signals can coordinate movement of the base plate 108 (via control of the robotic device 106) with the operation of the light source 104 to form the object specified by the 3D model (e.g., the arch-shaped object 112) in a layer-by-layer manner. In particular, each layer of resin in the object 112 is formed by exposing of resin 118 in the resin container 102 to radiation 116 from the light source 104. The shape of each layer can be based on the pattern with which the radiation 116 exposes the resin 118, and the thickness and/or orientation of each layer with respect to others can be based on the movement of the base plate 108 with respect to the resin container 102 in between fabrication of each layer.

Figure 1B:
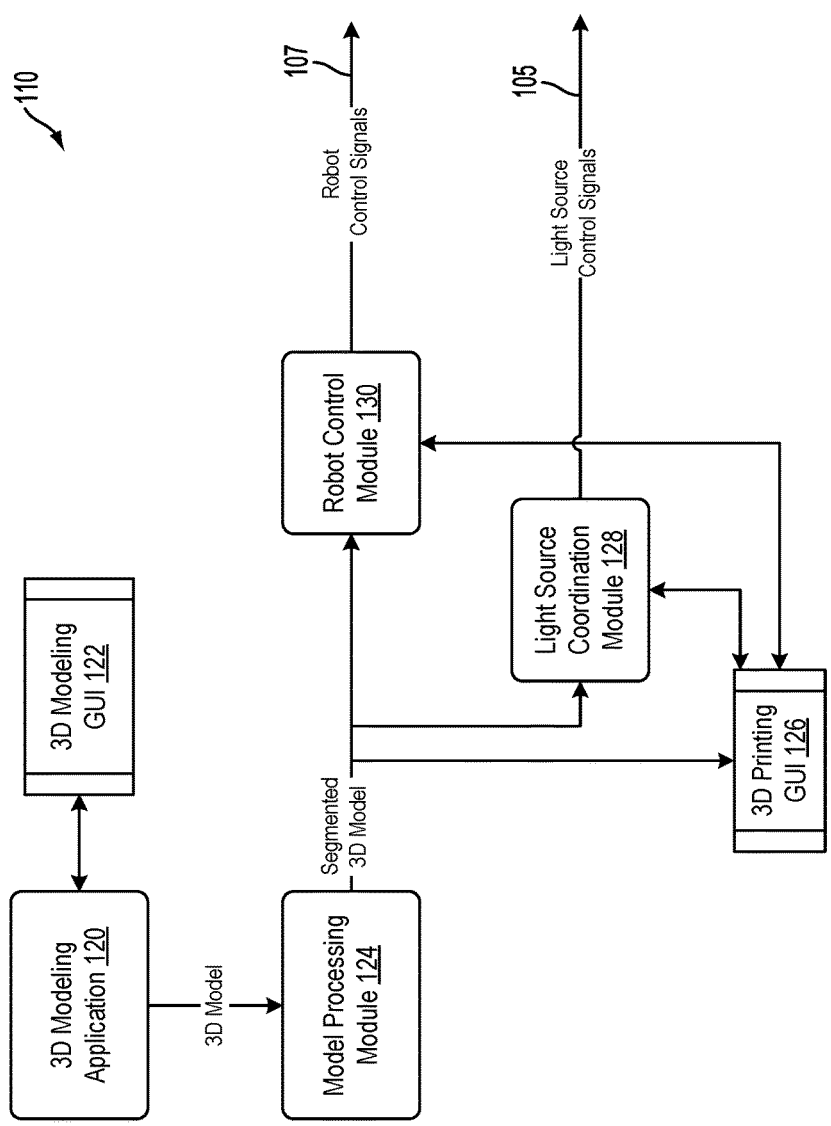
FIG. 1B shows an example control system for interfacing with and operating an example 3D printer system, according to an example embodiment.
Figure 1D:
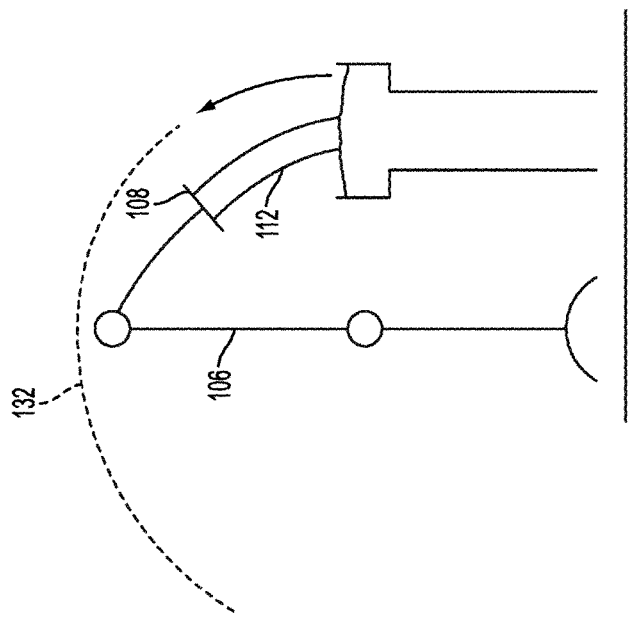
FIGS. 1C, 1D, 1E, and 1F illustrate motion of a robotic arm during the process of fabricating an object with an example 3D printer system, according to an example embodiment.
Figure 1C:
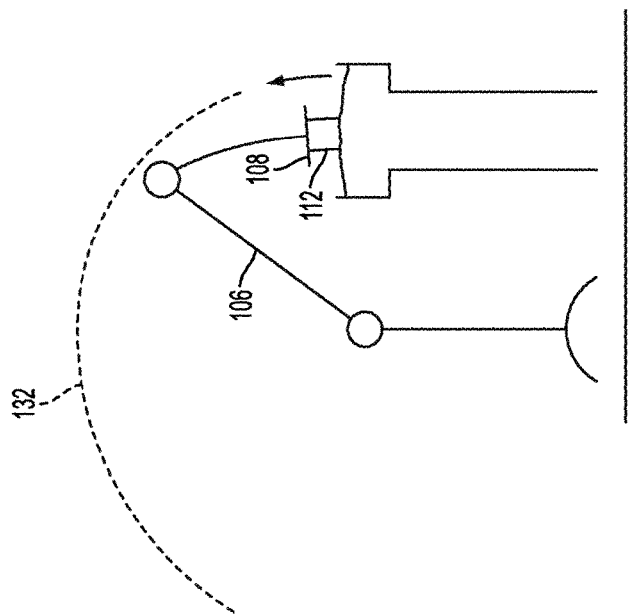
Figure 1E:
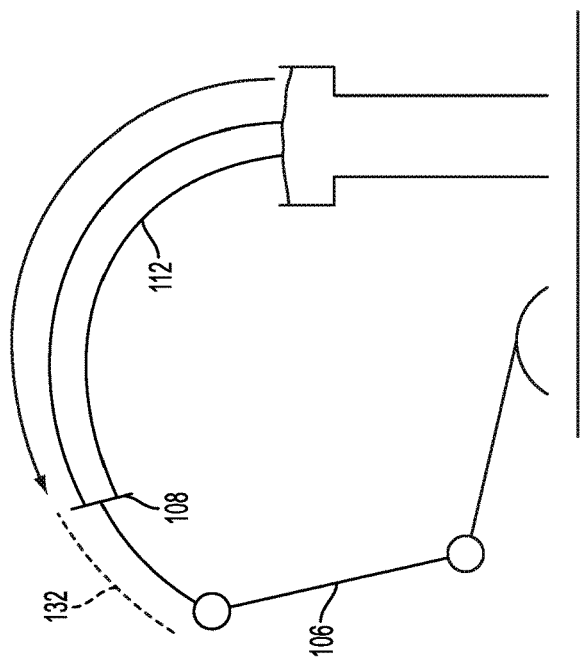
Figure 1F:
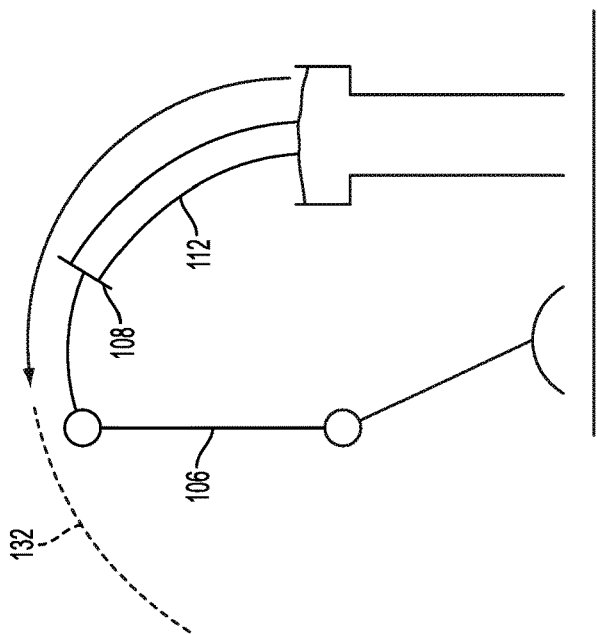

FIG. 1B shows example program logic modules in the control system 110 for interfacing with and operating the example 3D printer system 100. The control system 110 can include a 3D-modeling application 120 and corresponding graphical user interface (GUI) 122. The 3D-modeling application 120 may receive inputs from a user, via the GUI 122, that indicate one or more features of a 3D model for an object. Together, the 3D-modeling application 120 and corresponding GUI 122 may operate to generate data indicative of a 3D model for the object. The 3D model for the object can be provided to a model-processing module 124 to prepare the 3D model for printing.

The model-processing module 124 may apply a slicing process to the 3D model. The model-processing module 124 may use various techniques to mathematically define an isosurface mesh for the 3D model, which may then be sliced into a set of individual layer that can be printed one at a time. For instance, each layer may be based on points of intersection between a pair of planes that define a top and bottom of the layer and the isosurface mesh, and/or points of intersection between a single plane near the midpoint of the layer and the isosurface mesh. Other examples are also possible.

For instance, the slicing process may use the 3D model to generate a set of segments, which each correspond to a layer of the object to be created. The object indicated by the 3D model can be created by sequentially fabricating each layer and adhering the layers together layer by layer. In addition, the 3D model may be sliced along non-parallel planes, such that some or all of the segments have opposing surfaces that are non-parallel (e.g., such that some of the segments have non-uniform thicknesses).

The segmented 3D model (i.e., set of segments generated by the model-processing module 124) may then be passed to both: (i) a robot-control module 130, which may generate robot control signals 107, and (ii) a light source coordination module 128, which may generate light source control signals 105. The robot control signals 107 and the light source control signals 105 cause the robotic arm 106 and the light source 104, respectively, to operate so as to fabricate each of the multiple layers specified by the segmented 3D model. The robot control module 130, the light source coordination module 128, and/or other program logic modules may coordinate the timing of the robot control signals 107 with the timing of the light source control signals 105, so that the 3D printing process is properly carried out, in order to print a 3D object based on the 3D model.

In addition, the segmented 3D model may be provided to a 3D printing GUI 126, which can display information related to each layer and/or allow for a user to interface with the light source coordination module 130 and/or light source coordination module 128 so as to monitor and/or modify the 3D printing process. For instance, The GUI 126 may provide a 3D rendering window of the 3D model and robotic arm 106, which is updated throughout the 3D printing process to show the current status of the process. The visualization of the 3D object and the printing system may be generated from a rendering environment in which the 3D object and components of the 3D printing system are rendered based on respective initial coordinates, and movements within the rendering environment that correspond to the robot control instructions and/or robot position feedback sensors. The GUI 126 may also include a progress indicator that may move across a timeline to indicate a current point in the 3D printing process and/or estimated time to completion.

Further, the example GUI 126 may allow the user to control or modify the 3D printer system 100 before and/or during the printing process. For example, the user may be able to change or modify the movements of the robotic arm. As another example, the user may be able to change the shape of a given layer via interaction with an interface that includes a rendering of the given layer. In some cases, the GUI 126 may allow the user to pause the 3D printing process, make adjustments, and then resume the printing process. Additionally or alternatively, the GUI 126 may allow the user to make adjustments in real-time, during the printing process.

H. Resin Container Membrane

Figure 1G:
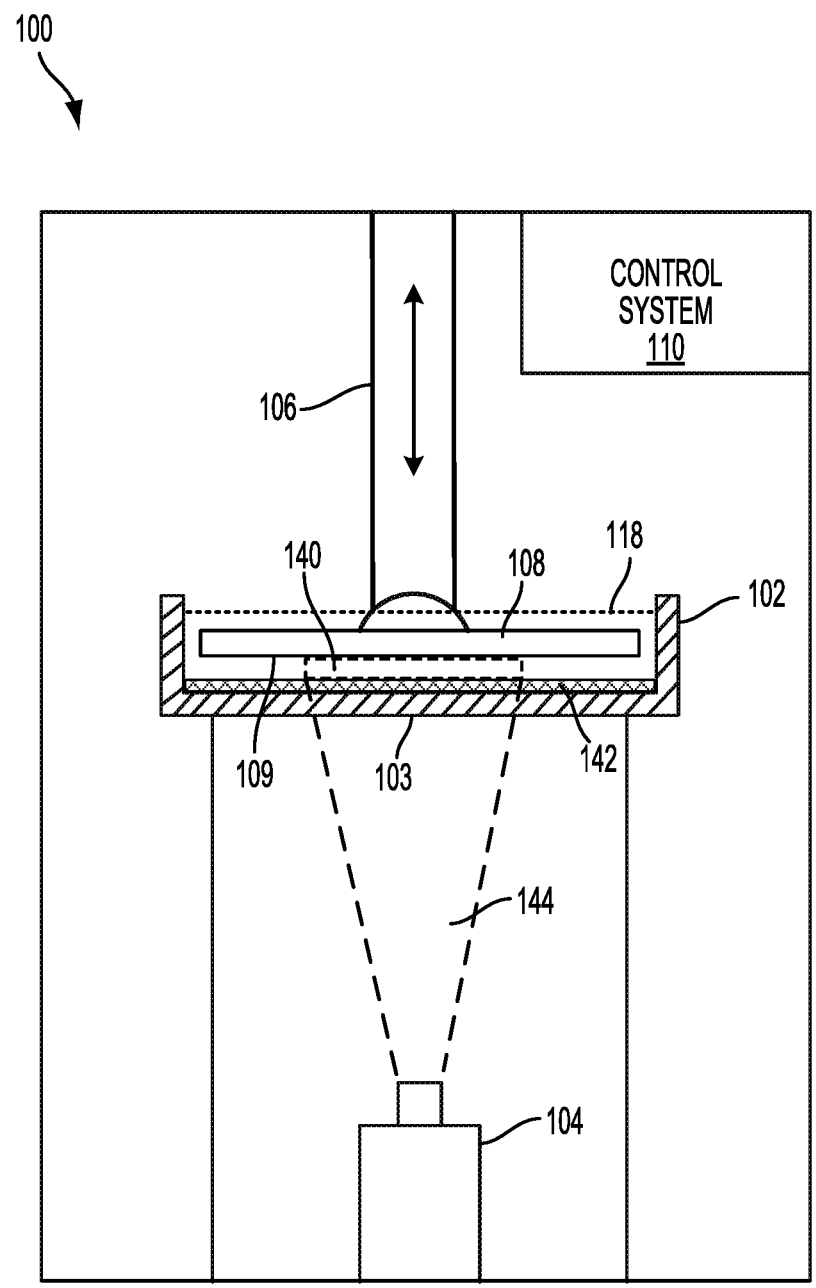
FIG. 1G shows a 3D printer system during fabrication of a first layer of an object, according to an example embodiment.

FIG. 1G shows the 3D printer system 100 during fabrication of a first layer of an object. As shown in FIG. 1G, the 3D printer system 100 also includes a membrane 142 on the interior of the bottom 103 of the resin container 102. The membrane 142 may be formed from material that allows UV radiation 144 from the light source 104 to pass through to the liquid resin 118 within the resin container 102. For example, membrane 142 may be a layer (e.g., film or coating) of clear or semi-transparent material. Additionally or alternatively, the membrane 142 may be a material that is exhibits resistance to adhesion with cured resin, such as a silicone-based material or another material. For instance, the membrane 142 may include Polydimethylsiloxane (PDMS).

To print each layer of an object, the build surface 109 of the base plate 108 may be positioned in the resin 118, above the membrane 142. More specifically, the base plate 108 may be positioned such that the distance between the build surface 109 and the membrane 142 is substantially equal to the desired height of the layer being cured. In this context, "substantially equal" should be understood to mean that the separation is such that a layer of a desired height can be formed when the resin between the build surface 109 and the membrane 142 is cured; e.g., a separation that is equal or perhaps slightly greater than the desired height of the layer being cured (1 mm or slightly greater than 1 mm, if a layer of 1 mm is desired, for instance). A layer 140 of the 3D object may then be formed by exposing the resin that is between the build surface 109 and membrane 142 to UV radiation 144 from light source 104. The radiation 144 can be emitted with a particular spatial pattern that corresponds to the shape of the layer 140 being formed, such that the resin in that shape becomes cured to form the layer 140.

Following formation of the layer 140, the robotic arm 106 can move the base plate 108 upward, away from the resin container 102. The upward movement causes the layer to be removed from the membrane 142 while remaining adhered to the build surface 109. The robotic arm 106 can then position the base plate 108 such that a bottom surface of the layer 140 is separated from the membrane 142 by a distance corresponding to a width of the second layer of the object being formed. The light source 104 can then expose the resin occupying the region between the first layer 140 and the membrane 142, which cures at least some of the resin in that region in accordance with the pattern of the radiation from the light source 104, and forms the second layer on the first layer 140. The process can then be continued to form a given object, layer by layer, while moving the base plate 108 upward and away from the resin container 102 after completion of each layer, which detaches the most recently formed layer from the membrane 142 and also makes room for the next layer to be formed.

In some embodiments, membrane 142 may be formed from a polymer based on Polytetrafluoroethylene (PTFE), (e.g., Teflon), instead of PDMS or other materials. PTFE has similar adhesive characteristics as PDMS; e.g., cured resin does not significantly adhere to either material, which allows for cured resin forming each layer to be easily detached from the membrane once that layer is complete. However, PTFE tends to dissipate heat more efficiently than PDMS. As a result, the internal temperature of PDMS may increase more during the course of a 3D printing process, than the internal temperature of PTFE membrane does during a comparable 3D printing process. When the temperature of PDMS membrane increases, it may become more difficult to remove cured resin from a membrane of PDMS-based material. Therefore, using a PTFE-based material may allow for cleaner separation of a cured resin layer (e.g., layer 140) from the membrane 142.

III. Example Anchor Channels

As described in connection with FIGS. 1A through 1G, the 3D printer systems operate by suspending an in-progress object from the base plate while each layer is added by curing resin along the interior of the bottom of the resin container. During fabrication, while the object is not yet complete, the object is therefore adhered to the build surface 109 of the base plate 108. In some cases, a secure adhesion between the build surface 109 and the object being formed, particularly the first-formed layer of the object, may be important not only to prevent the object from detaching from the base plate 108, but also to allow the object to be precisely positioned with respect to the resin container 102 via manipulation of the base plate 108. For instance, if the object slides along the surface of the build surface in between formation of two layers, there will be a mis-alignment between those two layers (and perhaps subsequently formed layers). Moreover, the adhesion and/or friction forces that hold the object to the build surface 109 may not be enough to resist separation for a given weight and/or duration and therefore may introduce an upper limit on the size/shape/weight of objects that can be fabricated.

However, some embodiments of the presently disclosure relate to providing a base plate with features that enhance the ability of the base plate to adhere to an object being formed. In some examples, the anchoring features take the form of channels or recesses in the build surface that extend into the base plate. The channels or recesses may include sidewalls that define the width of the channel such that the channel becomes wider at greater depths within the channel. As a result, resin that is cured within the channel (e.g., by liquid resin that enters the channel and is then exposed to curing radiation while in the channel) is shaped to at least partially conform to the sidewalls. The increased width of the channel at greater depths within the channel causes cured resin therein to resist being pulled out of the channel via mechanical interaction with the sidewalls (e.g., the wide portions of the cured resin cannot be pulled through the narrow portion, and so contact with the sidewalls of the channel secures the cured resin within the channel). Various examples of such anchoring features are described herein by way of example in connection with FIGS. 2A-2D.

A. Wedge-Shaped Anchor Channels

Figure 2A:
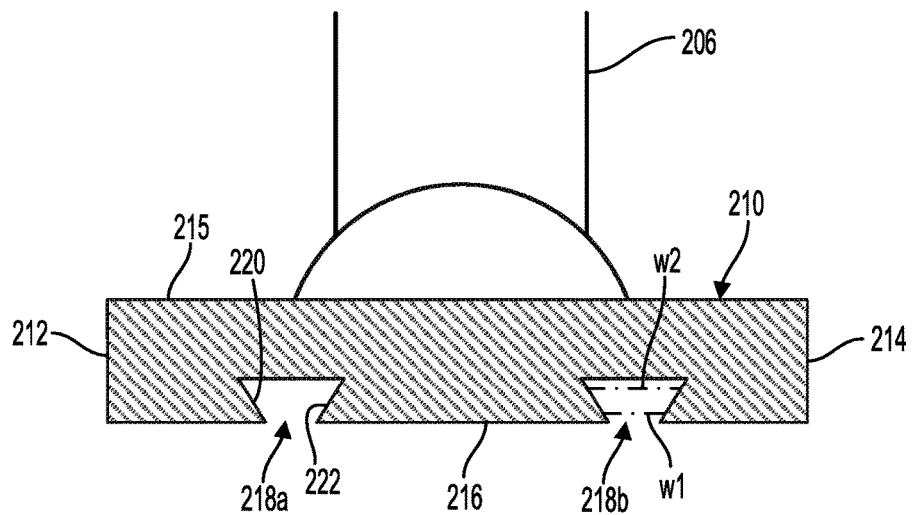
FIG. 2A shows a cross-sectional view of an example base plate with anchor channels, according to an example embodiment.

FIG. 2A shows a cross-sectional view of an example base plate 210 with anchor channels 218a-b. The base plate 210 is mounted to a robotic arm 206, which may be similar to the robotic arm 106. The base plate 210 includes a mount surface 215, a build surface 216, and sidewalls 212, 214 that connect the edges of the mount surface 215 and build surface 216. The mount surface 215 may include one or more features for attaching the base plate 210 to the robotic arm 206. The build surface 216 is a surface on which an object can be formed layer by layer using a 3D printer system. A first anchor channel 218a and a second anchor channel 218b are recesses into the base plate 210 that extend from openings in the build surface 216.

Figure 2B:
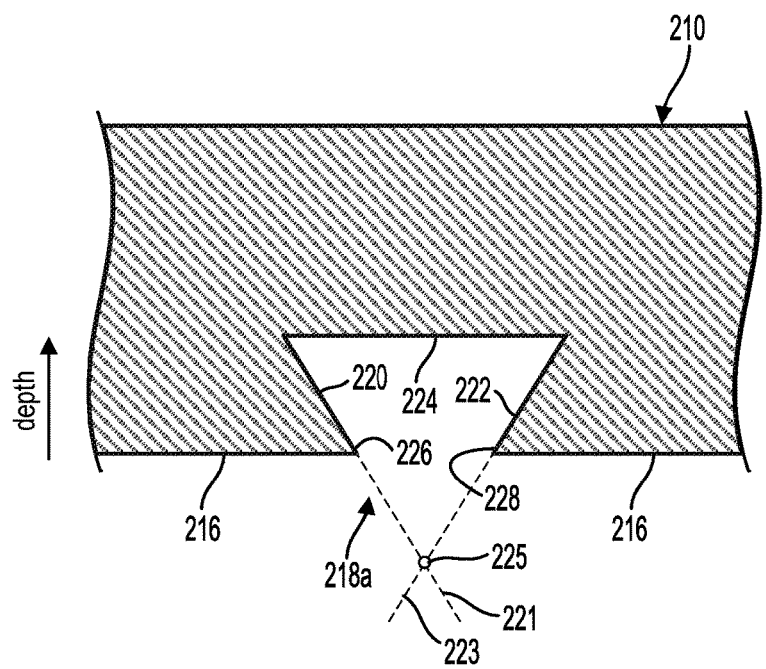
FIG. 2B is a close in view of one of the anchor channels shown in FIG. 2A.

FIG. 2B is a close-in view of the first anchor channel 218a. The anchor channel 218a has sidewalls 220, 222 that define a width of the anchor channel 218a by a separation distance between the two sidewalls 220, 222. The sidewalls 220, 222 can be oriented with respect to one another such that the width of the anchor channel 218a increases with depth into the base plate 210. As used herein, the depth of the anchor channel 218a refers to a distance from the build surface 216, or a plane defined by the build surface 216, along a direction transverse to the build surface 216. For example, the sidewalls 220, 222 are closer together near the opening to the build surface 216, than closer to a terminal end 224 of the anchor channel 218a. The terminal end 224 may be a surface that defines a maximal depth of the anchor channel 218a into the base plate 210. The first anchor channel 218a is recessed into the build surface 216 through an opening in the build surface 216, which is bounded by two lip edges 226, 228. The lip edge 226 can be defined by the junction of the sidewall 220 and the build surface 216; and the lip edge 228 can be defined by the junction of the sidewall 222 and the build surface 216.

The second anchor channel 218b may be the same as the first anchor channel 218a except located at a different position on the build surface 216. As shown in FIG. 2A in the illustration of the second anchor channel 218b, the anchor channels 218a-b can each have a first width w1 at a first depth, and a second width w2 at a second depth. In some examples, the widths w1, w2 at the respective depths may be substantially constant along a length of the anchor channel 218b (e.g., the wedge-shape of the of the anchor channel 218b may be constant along the length of the anchor channel 218b, which length is oriented perpendicular to the page). The first width w1 can be less than the second width w2 and the first depth can be less than the second depth.

In some examples, the anchor channels 218a-b may additionally or alternatively be characterized by a cross-sectional area transverse to the depth into the base plate 210, which increases with depth. For example, in an embodiment in which the shape of the anchor channel 218b is constant along its length the anchor channel 218b has a first cross-sectional area at the first depth, and a second cross-sectional area at the second depth. The first and second cross-sectional areas may be the length of the anchor channel 218b multiplied by the first width w1 and the second width w2, respectively, such that the second area is greater than the first area. Other examples are also possible in which the sidewalls of an anchor channel define a width and/or cross-sectional area that is non-uniform with respect to depth so as to resist extraction of a structure shaped to conform to the sidewalls.

Due to the shape of the anchor channels 218a-b, a cured resin structure that substantially conforms to the sidewalls 220, 222 can resist being pulled out of the anchor channel 218a-b, in a direction transverse to the build surface 216. Thus, an object formed over the anchor channels 218a-b so as to adhere to cured resin within the channels may be better secured to the base plate 210 than to a base plate without such features. In particular, the cured resin within the anchor channels enhances the mechanical coupling between the base plate 210 and the object being formed because the cured resin within the anchor channels 218a-b is able to adhere to the first-formed layer of the object, which is also disposed on the build surface 216, with a greater adhesion than the first-formed layer adheres to the build surface 216. The enhanced adhesion of resin to already-cured resin relative to the build surface 216 may be at least partially because curing resin over already-cured resin (e.g., the cured resin in the anchor channels 218a-b) may cause the already-cured resin to partially photo-activate and re-cure along with the newly-cured resin, which may partially weld the two layers of resin together.

As shown in the cross-sectional views of FIGS. 2A and 2B, the anchor channels 218a-b can each be wedge-shaped or dovetail-shaped in which the two sidewalls 220, 222 (or at least portions thereof) are substantially planar and the terminal end 224 is substantially parallel to the build surface 216. In particular, in the illustration of FIG. 2B, each of the sidewalls 220, 222 and the terminal end 224 can correspond to a planar surface that is perpendicular to the page. Thus, the sidewalls 220, 222 can be oriented with respect to one another such that planar surfaces 221, 223 corresponding to the sidewalls 220, 222, respectively, intersect at a line 225. The line 225 can be located below the build surface 216, and approximately equidistant from each of the lip edges 226, 228 that define the opening of the anchor channel 218a. In particular, although shown as a point in the cross-sectional view of FIG. 2B, the line 225 may be oriented along a length of the anchor channel 218a, perpendicular to the page.

B. T-Shaped Anchor Channels

Figure 2C:
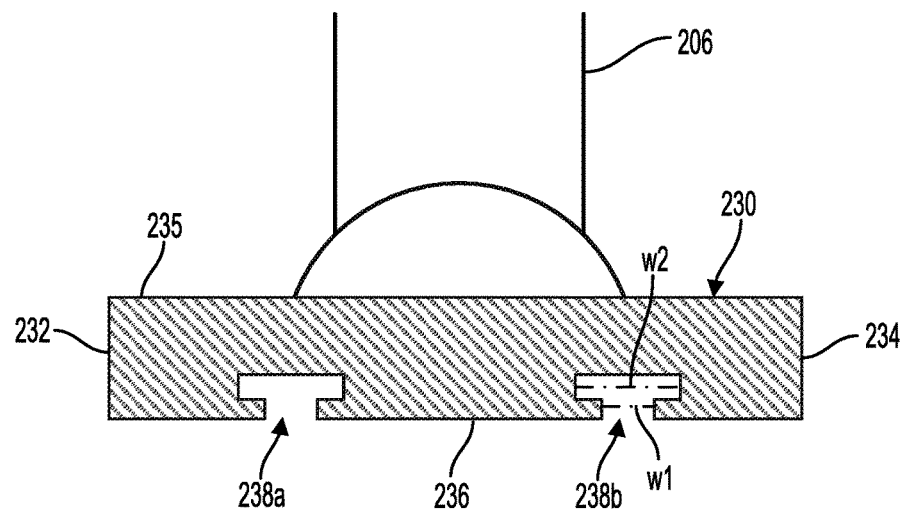
FIG. 2C shows a cross-sectional view of an example base plate with anchor channels, according to an example embodiment.

FIG. 2C shows a cross-sectional view of an example base plate 230 with anchor channels 238a-b. The base plate 230 is mounted to a robotic arm 206, which may be similar to the robotic arm 106. The base plate 230 includes a mount surface 235, a build surface 236, and sidewalls 232, 234 that connect the edges of the mount surface 235 and build surface 236. The mount surface 235 may include one or more features for attaching the base plate 230 to the robotic arm 206. The build surface 236 is a surface on which an object can be formed layer by layer using a 3D printer system. A first anchor channel 238a and a second anchor channel 238b are recesses into the base plate 230 that extend from openings in the build surface 236.

Figure 2D:
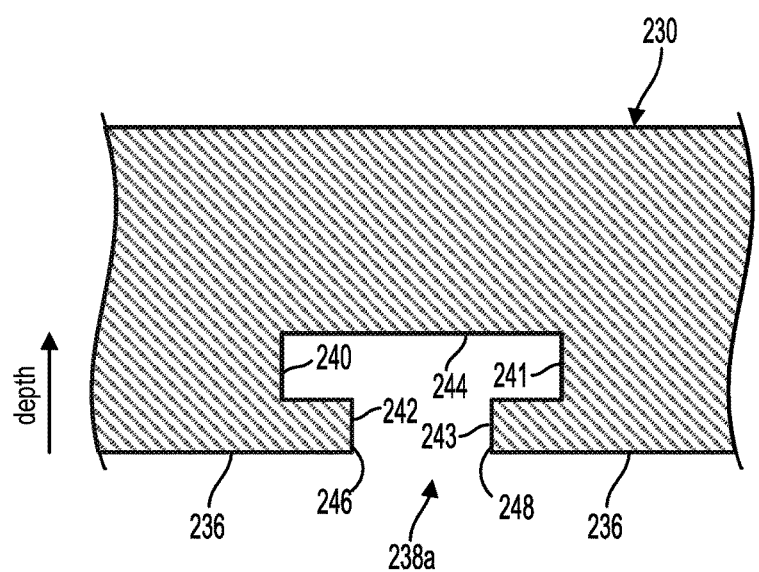
FIG. 2D is a close in view of one of the anchor channels shown in FIG. 2C.

FIG. 2D is a close-in view of the first anchor channel 238a. The anchor channel 238a has sidewalls 240, 241, 242, 243 that define a width of the anchor channel 238a by a separation distance between the sidewalls 240-243. In addition, the sidewalls can define distinct widths at different depths of the anchor channel 238a. For example, the sidewalls 240, 241 can be separated by a greater amount than the sidewalls 242, 243; and the sidewalls 240, 241 can be at a greater depth than the sidewalls 242, 243. Thus, the anchor channel 238a can have a smaller width w1 near the opening to the build surface 236, than closer to a terminal end 244 of the anchor channel 238a, where the anchor channel 238a can have a greater width w2. The terminal end 224 may be a surface that defines a maximal depth of the anchor channel 238a into the base plate 230. The first anchor channel 238a is recessed into the build surface 236 through an opening in the build surface 236, which is bounded by two lip edges 246, 248. The lip edge 246 can be defined by the junction of the sidewall 242 and the build surface 236; and the lip edge 248 can be defined by the junction of the sidewall 243 and the build surface 236.

The second anchor channel 238b may be the same as the first anchor channel 238a except located at a different position on the build surface 236. As shown in FIG. 2C in the illustration of the second anchor channel 238b, the anchor channels 238a-b can each have a first width w1 at a first depth, and a second width w2 at a second depth. The first width w1 can be less than the second width w2 and the first depth can be less than the second depth. In some examples, the widths w1, w2 at the respective depths may be substantially constant along a length of the anchor channel 238b (e.g., the T-shape of the of the anchor channel 238b may be constant along the length of the anchor channel 238b, which length is oriented perpendicular to the page). In some examples, the anchor channels 238a-b may additionally or alternatively be characterized by a cross-sectional area transverse to the depth into the base plate 230, which increases with depth. For example, in an embodiment in which the shape of the anchor channel 238b is constant along its length the anchor channel 238b has a first cross-sectional area at the first depth, and a second cross-sectional area at the second depth. The first and second cross-sectional areas may be the length of the anchor channel 238b multiplied by the first width w1 and the second width w2, respectively, such that the second area is greater than the first area. Other examples are also possible in which the sidewalls of an anchor channel define a width and/or cross-sectional area that is non-uniform with respect to depth so as to resist extraction of a structure shaped to conform to the sidewalls.

Due to the shape of the anchor channels 238a-b, a cured resin structure that substantially conforms to the sidewalls 240-243 can resist being pulled out of the anchor channel 238a-b, from a direction transverse to the build surface 236. Thus, an object formed over the anchor channels 238a-b so as to adhere to cured resin within the channels may be better secured to the base plate 230 than to a base plate without such features. In particular, the cured resin within the anchor channels enhances the mechanical coupling between the base plate 230 and the object being formed because the cured resin within the anchor channels 238a-b is able to adhere to the first-formed layer of the object, which is also disposed on the build surface 236, with a greater adhesion than the first-formed layer adheres to the build surface 236. The enhanced adhesion of resin to already-cured resin relative to the build surface 236 may be at least partially because curing resin over already-cured resin (e.g., the cured resin in the anchor channels 238a-b) may cause the already-cured resin to partially photo-activate and re-cure along with the newly-cured resin, which may partially weld the two layers of resin together.

As shown in the cross-sectional views of FIGS. 2C and 2D, the anchor channels 238a-b can each be T-shaped in which the sidewalls 240, 241, 242, 243 (or at least portions thereof) are substantially planar and perpendicular to the build surface 236, and the terminal end 244 is substantially parallel to the build surface 236. In particular, in the illustration of FIG. 2D, each of the sidewalls 240-243 and the terminal end 244 can correspond to a planar surface that is perpendicular to the page. A narrow portion of the anchor channel 238a is defined between the sidewalls 242, 243, extending from the lip edges 246, 248, to a broad portion of the anchor channel 238a. The broad portion can have a width defined between the sidewalls 240, 241. In between the narrow portion and the broad portion, overhang surfaces can connect the sidewalls 240 and 242 and the sidewalls 241 and 243. The overhang surfaces may be approximately parallel to the build surface 236. The overhang surfaces may not be visible along a line of sight that passes through the opening of the channel 238a.

Because the anchor channels 218a-b, 238a-b are each formed such that a portion of the anchor channel has a greater width area than another portion at a lesser depth (e.g., closer to the build surface 216, 236), cured resin within the anchor channel resists being pulled out of the anchor channel through the opening. In particular, cured resin can be held within the anchor channel (i.e., resist extraction) via mechanical interaction between the cured resin surfaces that conform to the sidewalls and the portion of the sidewalls that transition the anchor channel from a broad width (e.g., the region of anchor channels 218a-b, 238a-b with width w2) to a narrow width (e.g., the region of anchor channels 218a-b, 238a-b with width w1).

C. Example Operation

Figure 4:
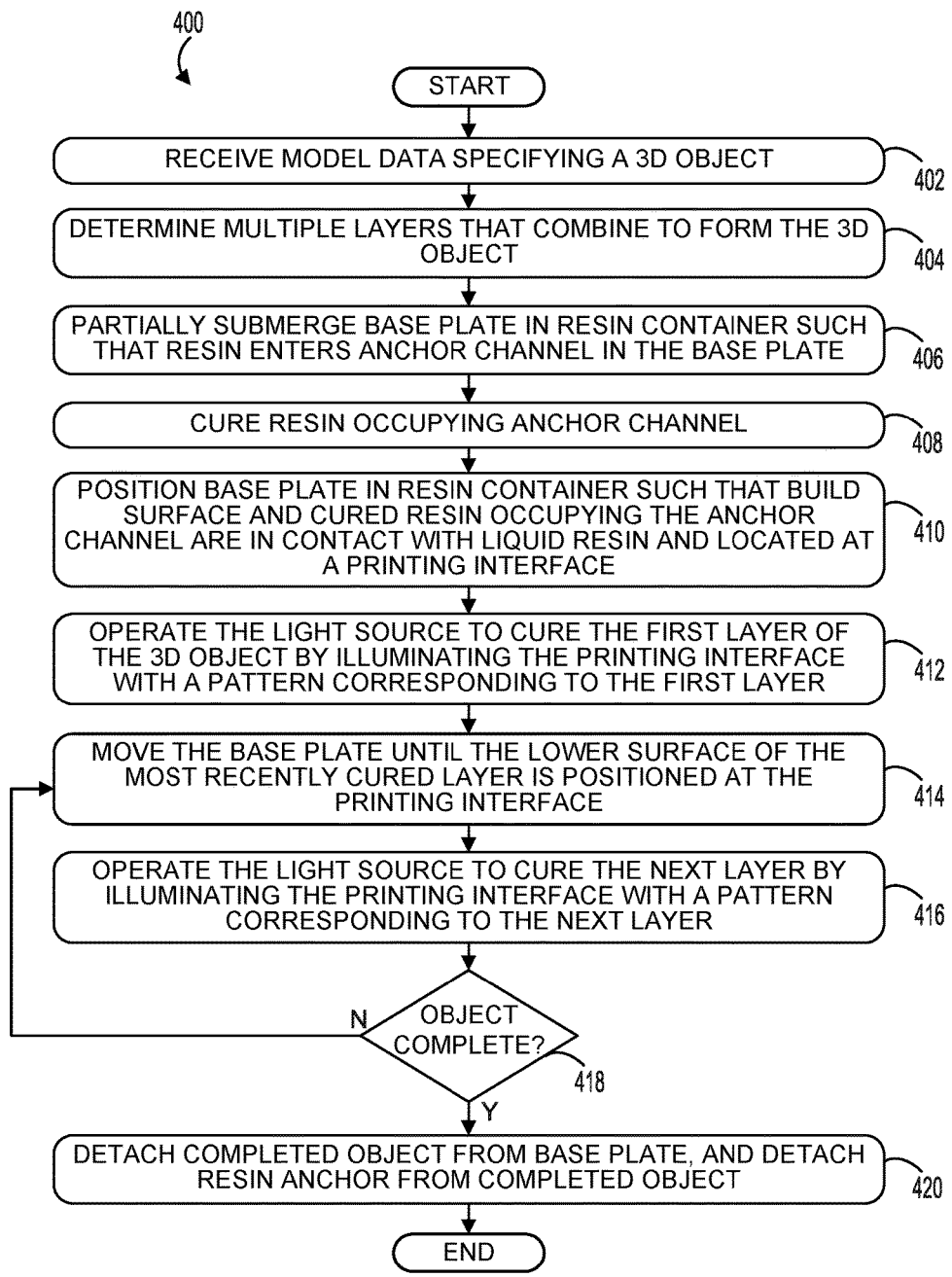
FIG. 4 is a flowchart illustrating an example process that may be performed using a 3D printer system, according to an example embodiment.

FIGS. 3A-3F illustrates chronological stages of fabricating an object from multiple layers using an example 3D printer system having anchor channels. FIG. 4 is a flowchart illustrating an example process 400 for fabricating an object using a 3D printer system. The process 400 is described, by way of example, in connection with the chronological fabrication stages illustrated in FIGS. 3A to 3F.

1. Determine Layers Corresponding to 3D Object

At block 402, a control system for a 3D printer system can receive model data specifying a 3D object. The received data may be, for example, model data from a 3D modeling application, such as the 3D modeling application 120 described in connection with FIG. 1B. At block 404, the control system can determine multiple layers that combine to form the 3D object specified by the received model data. The multiple layers may be, for instance, data indicative of a set of shapes and each shape in the set can correspond to one of the multiple layers to be formed chronologically during fabrication of the specified object by curing each of the layers with exposure to radiation. The data specifying the multiple layers may, for example, segmented 3D model data from a model processing module, such as the model processing module 124 described in connection with FIG. 1B.

2. Cure Resin Occupying Anchor Channel

At block 406, a base plate can be at least partially submerged in resin within a resin container such that resin enters an anchor channel in the base plate. For example, as shown in FIG. 3A, the robotic arm 206 can move the base plate 210 downward, into the resin container 102. The base plate 210 may be positioned with the build surface 216 wholly or partially submerged within the resin 118 (i.e., below the surface of the resin 118). Upon the build surface 216 moving below the surface of the resin 118, the resin 118 enters the anchor channels 218a-b through the openings in the build surface 216. In some examples, the base plate 210 may be moved to a position at which the resin within the anchor channels 218a-b can be cured by exposure to radiation from a light source. For instance, as shown in FIG. 3B, the base plate 210 may be positioned such that the build surface 216 is disposed on the membrane 142 which coats the interior of the bottom of the resin container 102 and is at least partially transparent to radiation transmitted through the bottom. As such, the membrane 142 can define a boundary of the resin occupying the anchor channels 218a-b that is substantially co-planar with the build surface 216. Thus, upon curing the resin within the anchor channels 218a-b, the cured resin and the build surface 216 can combine to provide a substantially continuous planar surface on which the object can be formed.

At block 408, the resin occupying the anchor channel can be cured by illuminating the anchor channel with radiation, which exposes the resin therein and thereby cures the photo-reactive resin. For example, as shown in FIG. 3C the first anchor channel 218a (and the resin therein) can be illuminated by radiation 310a and the second anchor channel 218b (and the resin therein) can be illuminated by radiation 310b. The radiation 310a-b cures the resin within the anchor channels 218a-b, resulting in anchor resin 320a-b (shown in FIG. 3D) that shaped to conform to the interior sidewalls of the anchor channels 218a-b. While the anchor resin 320a-b (i.e., the cured resin occupying the anchor channels 218a-b) may be cured via exposure to light emitted by a light source situated below the resin container, as shown in FIG. 3C, the anchor resin may be cured by other techniques as well. Some example anchor curing techniques are described in connection with FIGS. 5A-5D.

a. Anchor Resin Cured by Layer-Curing Light Source

Figure 5A:
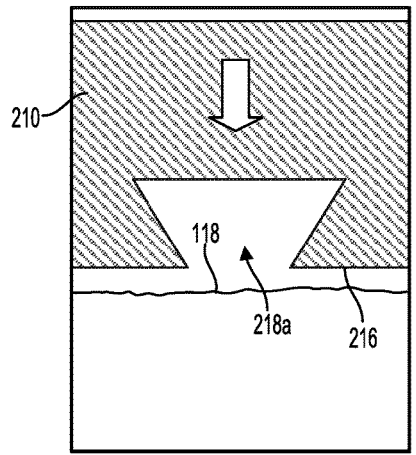
FIG. 5A is a close in view of a base plate having an anchor channel that is approaching a resin surface according to an example embodiment.
Figure 5B:
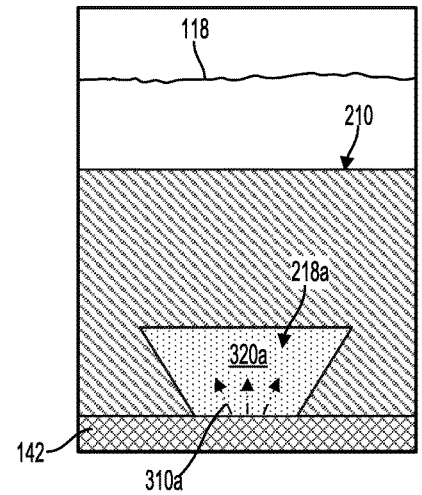
FIG. 5B is a close in view of a base plate having an anchor channel that is submerged in resin while resin within the anchor channel is cured, according to an example embodiment.

FIG. 5A shows base plate 210 in cross-section as it moves downward such that the build surface 216 and anchor channel 218a approach the surface of resin 118. The block arrow superimposed on the base plate 210 indicates the downward direction of motion with respect to the surface of resin 118. FIG. 5B shows the base plate 210 positioned such that the build surface 216 contacts the membrane 142, which coats the interior of the bottom of resin container 102. As a result, the anchor channel 218a is occupied by resin 118. In some cases, contact between the membrane 142 and the build surface 216 may displace the resin along the membrane 142 such that the build surface 216 does not have significant contact with resin 118 while in the position shown in FIG. 5B. So positioned, the resin occupying the anchor channel 218a can be cured via exposure to radiation 310a transmitted through the bottom of the resin container and through the membrane 310a toward the anchor channel 218a. Curing the resin occupying the anchor channel 218a results in the anchor resin 320a that is cured so as to at least partially conform to the anchor channel 218a.

In some examples, to ensure that the anchor resin 320a is able to be cured via the radiation 310a entering the anchor channel 218a through the opening in the build surface 216, the radiation 310a may be configured to have a spread angle that causes some of the radiation 310a to be substantially parallel to each of the sidewalls of the anchor channel 218a. For instance, radiation from a light source below the resin container may be diffused via optical elements used while curing the anchor resin 320a. Additionally or alternatively, the sidewalls and/or end of the anchor channel 218a may incorporate reflective features that help direct the incoming radiation 310a to cure resin in portions of the anchor channel 218a that are not directly exposed by line of sight to the opening. Other examples are also possible in which reflective and/or transmissive optical elements are incorporated into the optical pathway of the radiation 310a and/or the surface of the anchor channel 218a to help ensure the radiation 310a cures the resin occupying the anchor channel 218a. Moreover, in some cases, the shape of the anchor channel 218a (e.g., the orientations the sidewalls) may be selected at least in part to ensure that resin within the anchor channel 218a can be cured via the radiation 310a entering the opening of the anchor channel 218a. For instance, the relative orientation of the two sidewalls of the anchor channel 218a may be selected to correspond to the spreading angle of the radiation 310a that is transmitted through the membrane 142.

b. Anchor Resin Cured by Anchor-Curing Light Source

Figure 5C:
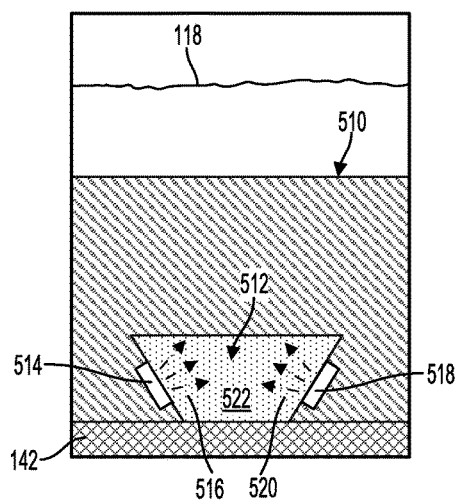
FIGS. 5C and 5D show base plates submerged in resin that cure resin within their respective anchor channels by light emitted from the sidewalls of the respective anchor channels, according to example embodiments.
Figure 5D:
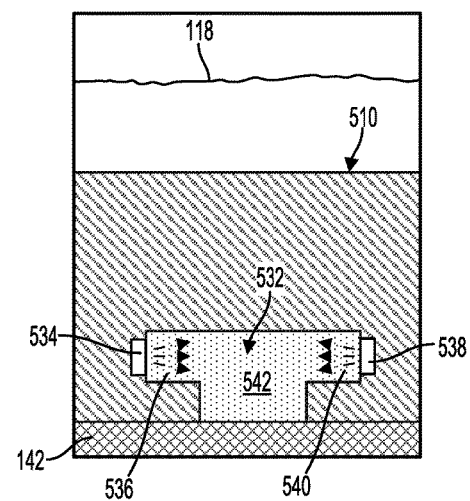

Additionally or alternatively, resin occupying the anchor channel may be cured using one or more light sources integrated into the base plate. FIGS. 5C and 5D show base plates submerged in resin that cure anchor resin 522, 542 within the respective anchor channels by light emitted from the sidewalls of the respective anchor channels.

FIG. 5C shows a base plate 510 having a wedge-shaped anchor channel 512. The base plate 510 is submerged in the resin 118 such that a build surface of the base plate 510 is disposed on the membrane 142 that coats the interior of the bottom of resin container 102. The base plate 510 also includes anchor-curing light sources 514, 518 situated to emit radiation 516, 520 into the anchor channel 512 from the two sidewalls of anchor channel 512. The anchor-curing light sources 514, 518 may be light emissive diodes configured to emit radiation that cures the photo-reactive resin 118, similar to the light source 104. The anchor-curing light sources 514, 518 can be mounted within the base plate 510 such that respective lenses of the light sources 514, 518 are substantially co-planar with the sidewalls of the anchor channel 512.

FIG. 5C shows a base plate 530 having a T-shaped anchor channel 532. The base plate 530 is submerged in the resin 118 such that a build surface of the base plate 530 is disposed on the membrane 142 that coats the interior of the bottom of resin container 102. The base plate 530 also includes anchor-curing light sources 534, 538 situated to emit radiation 536, 540 into the anchor channel 532 from the sidewalls of anchor channel 532. The anchor-curing light sources 534, 538 may be light emissive diodes configured to emit radiation that cures the photo-reactive resin 118, similar to the light source 104. The anchor-curing light sources 534, 538 can be mounted within the base plate 530 such that respective lenses of the light sources 534, 538 are substantially co-planar with the sidewalls of the anchor channel 532 that define a broad section of the T-shaped anchor channel 532. As a result, the resin occupying the broad section of the T-shaped anchor channel 532, which is shielded from a direct line of sight to the opening of the anchor channel 532 can be cured via the radiation 536, 540 from the anchor-curing light sources 534, 538.

In some examples, the anchor channels described herein may include one or more additional optical elements that direct light emitted by an anchor-curing light source to resin occupying the anchor channels. For example, the sidewalls and/or ends of the anchor channel may include one or more reflective surfaces, mirrors, lenses, optical waveguides, diffusers, etc., arranged so as to direct light emitted by a given anchor-curing light source to a desired region of the anchor channel. In some cases, anchor-curing light sources may be integrated into the terminal ends of anchor channels 512, 532, so as to emit radiation downward into the anchor channel 512, 532, toward the membrane 142.

Further, many other shapes/geometries of anchor channels may be used depending upon particular applications, and those anchor channels may include integrated anchor-curing light sources that emit radiation from the sidewalls and/or ends of the anchor channels to cure resin occupying the anchor channel. In some cases, the anchor-curing light sources may be situated so as to at least expose resin that is shielded from a line of sight to the opening of the anchor channel.

3. Fabricate Object by Forming Each Layer in Turn

At block 410, the base plate is positioned such that the build surface and the cured resin within the anchor channel are in contact with liquid resin and located at a printing interface. The anchor resin (i.e., the resin cured within the anchor channels) combines with the build surface to provide a surface on which the first layer of the object can be formed. Thus, as shown in FIG. 3D, the anchor resin 320a-b may terminate near the opening of each anchor channel 218a-b with a surface that is approximately co-planar with the build surface 216, such as occurs when the anchor resin 320a-b is cured against the membrane 142 while the membrane 142 is in contact with the build surface 216. The base plate 210 can be moved upward using the robotic arm 206 until the separation between membrane 142 and the build surface 216 (and the anchor resin 320a-b co-planar with the build surface 216) is the thickness of the first layer of the object being fabricated. So positioned, the build surface 216 is at the printing interface of the 3D printer system (i.e., the region at which resin 118 is cured to become a layer of an object being fabricated). The printing interface of the 3D printer system can therefore be directly above the membrane 142, where radiation from the light source 104 is transmitted through the bottom 103 of the resin container 102. Thus, for the first-formed layer of a given object, the printing interface is at the build surface 216 of the base plate 210 (and the bottom surfaces of the resin anchors 320a-b), and for subsequently formed layers, the printing interface is at the surface of the most-recently cured layer.

At block 412, the light source below the resin container is used to cure the first layer of the object. The light source is operated to expose at least a portion of the resin situated between the membrane 142 and the build surface 216 with a pattern that corresponds to the first layer of the object. For example, as shown in FIG. 3E, the radiation 311 cures the first layer 321, which is disposed on the build surface 216 and the resin anchors 320a-b. The first layer 321 is therefore an arrangement of cured resin with a thickness based on the separation between the membrane 142 and the build surface 216 and a shape based on the pattern of the radiation 311. The first layer 321 adheres to the resin anchors 320a-b, which secures the first layer 321 to the build surface 216 of the base plate 210.

At block 414, after the first layer 321 has cured, the robotic arm 206 is used to move the base plate 210 upward. The upward movement of the base plate 210 causes the first layer 321 to detach from the membrane 142 while remaining adhered to the base plate 210 at least partially due to the resin anchors 320a-b. The base plate 210 is positioned such that a separation between the membrane 142 and the bottom of the most-recently formed layer (e.g., the first layer 321) equals a thickness of the next layer to be formed (e.g., the second layer 322).

At block 416, the light source is used to cure the next layer in the set of layers determined in block 404. The next layer is formed on the most-recently formed layer by illuminating at least a portion of the resin situated between the membrane 142 and the bottom of the most-recently formed layer with radiation from the light source. The radiation can be applied with a pattern that corresponds to a shape of the layer being formed. The newly formed layer of cured resin adheres to the previously formed layer of resin at locations where the newly formed layer overlaps the previously formed one. For example, as shown in FIG. 3F, the second layer 322 can be cured by a pattern of radiation 312 that corresponds to the shape of the second layer 322. While the radiation 312 is transmitted through the bottom of the resin container so as to cure the second layer 322, the base plate 210 can be positioned such that a separation between the membrane 142 and a bottom side of the first layer 321 corresponds to a desired thickness of the second layer 322.

At block 418, the control system may determine whether the object is complete, and if not, form the next layer by repeating blocks 414 and 416. The sequence of blocks 414 and 416 is repeated so as to sequentially form each of the multiple layers determined at block 404, with each layer formed over the previously formed one. Upon formation of the final layer of the set of layers, the specified 3D object is now completed and attached to the build surface of the base plate via the anchor resin within the anchor channels.

4. Detach Completed Object from Base Plate

At block 420, which is performed upon completion of the object (as determined at block 418), the completed object can be uncoupled from the base plate. In some cases, the completed object can be detached from the base plate by applying a force to the resin anchors and/or the base plate so as to slide the resin anchors through their respective anchor channels until the resin anchors emerge through openings a side of the base plate. Other examples are also possible. Further, once detached from the base plate, the resin anchors may be removed from the object. The resin anchors may be removed by grinding, polishing, cutting or otherwise separating the resin anchors from the object using an automated and/or manual process.

Figure 6A:
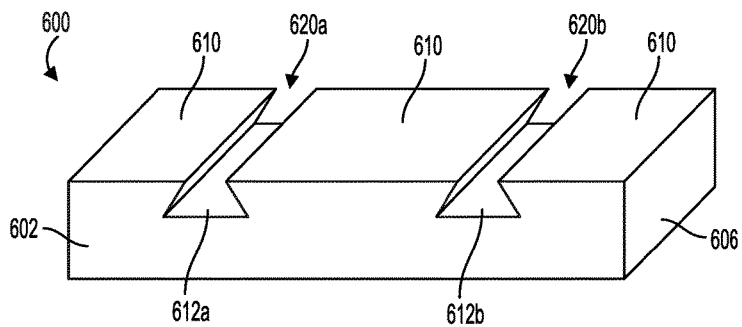
FIG. 6A is an aspect view of a base plate having anchor channels that extend across an entire length of the base plate, according to an example embodiment.
Figure 6B:
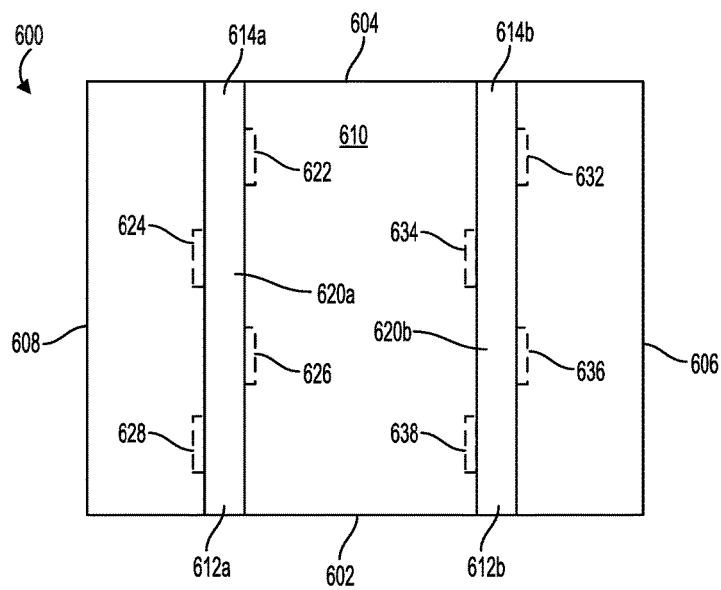
FIG. 6B is a bottom view of the base plate shown in FIG. 6A, looking toward the build surface.
Figure 6C:
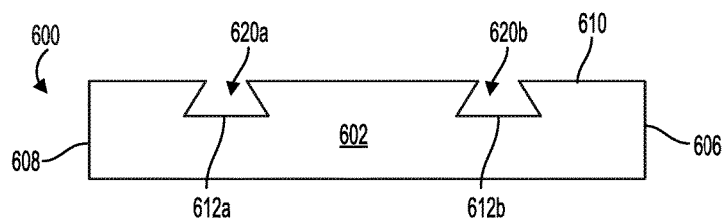
FIG. 6C is a side view of the base plate shown in FIG. 6A, looking down the length of the anchor channels.

FIG. 6A is an aspect view of a base plate 600. The base plate 600 has a build surface 610 with anchor channels 620a, 620b extend into the base plate 610 through openings in the build surface 610. FIG. 6B is a bottom view of the base plate 600, facing the build surface 610 straight on. FIG. 6C is a side view of the base plate 600, looking down the length of the anchor channels 620a-b.

The base plate 600 may be a rectangular cuboid except for the recesses into the build surface 610 formed by the anchor channels 620a-b. Thus, the base plate 600 can include four sidewalls 602, 604, 606, 608 that together define the length and width of the base plate 600. For example, the sidewalls 602, 604 can be approximately parallel sidewalls that bound the length of the base plate 600 (and of the build surface 610); and the sidewalls 606, 608 can be approximately parallel sidewalls 606, 608 that bound the width of the base plate 600 (and of the build surface 610). As shown, the two anchor channels 620a-b can each have a length that spans the entire length of the base plate 600. Thus, the anchor channel 620a can extend from an opening 612a in sidewall 602 to an opening 614a in sidewall 604. Similarly, the anchor channel 620b can extend from an opening 612b in sidewall 602 to an opening 614b in sidewall 604. Because the anchor channels 620a-b span the entire length of the base plate 600, and extend through the respective openings 612a, 614a and 612b, 614b in the sidewalls 602, 604, resin anchors may be extracted from the anchor channels 620a-b by sliding the resin anchors through the anchor channels 620a-b, such that the resin anchors exit through one of the openings. In some cases, force may be applied to resin anchors from one side of the base plate (e.g., through the openings 612a-b in sidewall 602) so as to cause the resin anchors (and a completed object adhered to the resin anchors) to exit from the other side of the base plate (e.g., through the openings 614a-b in sidewall 604).

In addition, the base plate 600 may include multiple anchor-curing light sources that are mounted so as to illuminate the anchor channels 620a-b with light that cures photo-reactive resin occupying the channels. For example, anchor channel 620a can have anchor-curing light sources 622, 624, 626, 628 that can operate to expose resin occupying anchor channel 620a to radiation so as to cure that resin. Similarly, anchor channel 620b can have anchor-curing light sources 632, 634, 636, 638 that can operate to expose resin occupying anchor channel 620b to radiation so as to cure that resin. In some cases, the light sources 622-638 can be arranged such that cured resin within anchor channels 620a-b (i.e., resin anchors) that is cured so as to conform with light-emitting surfaces of one of the light sources is able to slide through portions of the anchor channels 620a-b that do not include a light source. For instance, the light sources 622-638 may be situated such that a light-emitting lens of each of the light sources is substantially co-planar with adjacent sidewalls of the anchor channels 620a-b. As a result, resin cured alongside the light source lens may slide past the adjacent areas of the sidewalls and vice versa.

Although, it is noted that in some examples, a base plate may be implemented with a shape that is not a rectangular cuboid. For instance, in some cases, a base plate may have a build surface that is non-rectangular (e.g., circular, elliptical, triangular, etc.). Many other examples are also possible. Anchor channels may be incorporated into such base plates and may span an entire width or length of the base plate. Moreover, some anchor channels may extend through either one or two sidewalls of an arbitrarily shaped base plate without spanning an entire width of length thereof.

Figure 6D:
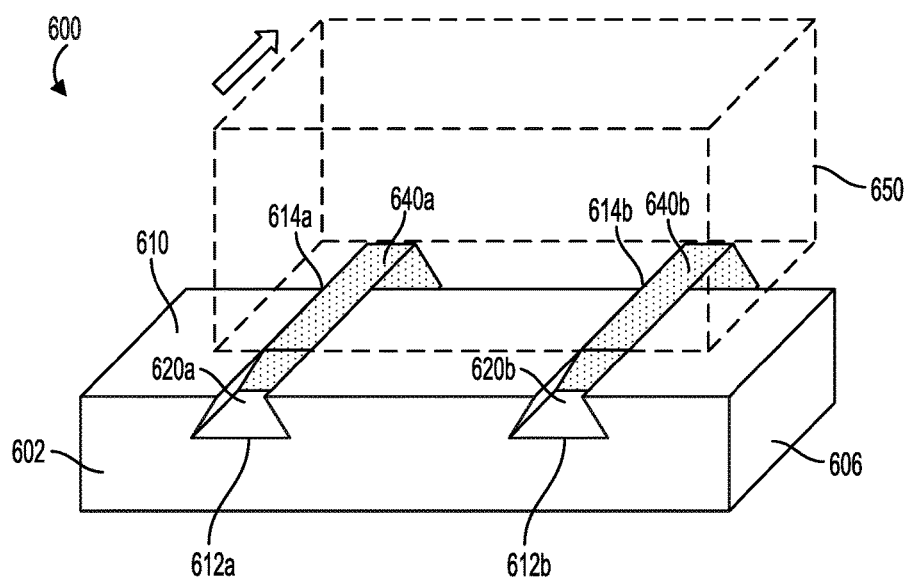
FIG. 6D illustrates a completed object being removed from the base plate shown in FIG. 6A.

FIG. 6D illustrates a completed object 650 being removed from the base plate 600. The completed object 650 is fabricated on the build surface 610 of the base plate 600 and is attached to resin anchors 640a, 640b within the anchor channels 620a-b of the base plate 600. For explanation purposes, in FIG. 6D, the completed object 650 is illustrated by a transparent frame of dashed lines, while the resin anchors 640a-b are illustrated with a halftone fill.

To remove the completed object 650 from the base plate 600, force may be applied to the resin anchors 640a-b through the openings 612a-b in the sidewall 602. For example, a hammer, another percussive tool, or another force-applying instrument may be used to apply force (e.g., impact) to a face of the resin anchors 640a and/or resin anchor 640b exposed through the respective openings 612a-b. The application of force may overcome an initial adhesion between the resin anchors 640a-b and the sidewalls of the respective anchor channels 620a-b so as to dislodge the resin anchors 640a-b from the positions in which they were initially cured. Additional force may then be applied to the resin anchors 640a-b through the openings 612a-b to cause the resin anchors 640a-b to slide through the anchor channels 620a-b and exit through the openings 614a-b in the sidewall 604 of the base plate 600. As the resin anchors 640a-b slide through the anchor channels 620a-b, the completed object 650 also slides across the build surface 610 of the base plate 610. The completed object 650 slides with the resin anchors 640a-b, rather than separates from the resin anchors, due to the greater mechanical strength of the adhesive bond between the resin anchors 640a-b to the first-formed resin layer of the object 650 as compared to the adhesive bond between the build surface 610 and the first-formed resin layer. Having the openings 612a-b and 614a-b at both ends of the anchor channels 620a-b enable the resin anchors 640a-b to be forced from one side while exiting the base plate 600 from the opposite side. Having openings at both ends of the anchor channels 620a-b also allows for a given completed object to be extracted in either of two different directions from the base plate, depending on various factors and/or constraints. However, some examples may involve base plates with openings at only one end of an anchor channel, and resin anchors therein can be extracted through the opening at that end while force is applied to the object and/or resin anchors by a different technique. For instance, a base plate may include an integrated ram or pushing plate along a closed end of each anchor channel, and the resin anchor may be extracted by actuating the ram to push the resin anchors out through the open end. Many other examples are also possible.

Further, to facilitate removal of the completed object 650 by sliding the resin anchors 640a-b through their respective anchor channels 620a-b, the anchor channels 620a-b may be configured individually and with respect to one another to allow such sliding movement. For example, each of the anchor channels 620a-b may have a shape transverse to the direction of sliding motion that is either substantially constant, or only increases in size along the direction of motion during extraction. Because the resin anchors 640a-b are formed so as to at least partially conform to the sidewalls of the anchor channels 620a-b, the widths and heights of the resin anchors 640a-b along the length of the anchor channels is determined by the shape of the anchor channel. Thus, to allow the resin anchor 640a-b to be extracted, the anchor channel should not have any sections that become more narrow or more shallow along the direction of extraction as it would prevent the wider and/or deeper sections of the resin anchor to pass through the narrow and/or shallow sections. The anchor channels 620a-b may have a cross-sectional shape (transverse to the direction of extraction) that is either substantially constant along the length of the anchor channels 620a-b or is monotonically increasing in dimension along the direction of motion during extraction.

In addition, in examples with multiple anchor channels (e.g. the two anchor channels 620a-b), separating the completed object 650 from the base plate 600 should be carried out by sliding the two resin anchors 640a-b through their respective anchor channels 620a-b simultaneously, because each resin anchor 640a-b may be connected to the object 650. As such, in some examples, the lengths of all anchor channels on a given base plate may be substantially parallel to one another such that the direction of motion of each resin anchor during extraction is substantially parallel.

However, some examples may also involve anchor channels that incorporate features that help retain resin anchors occupying the resin anchors until those features are overcome. For instance, one or more anchor channels may incorporate a section that becomes slightly more narrow than surrounding sections, such that the resin anchor occupying that anchor channel will initially resist sliding through the channel until enough force is applied to overcome the restriction (e.g., enough force to cause the resin anchor to deform so as to move past the narrow section). In another example, one or more anchor channels may have a length that is slightly non-parallel to others, which may similarly cause a resin anchor therein to initially resist sliding through the anchor channel until enough force is applied to overcome the resistance.

IV. Alternative Embodiments

In some embodiments, the various processes and/or techniques may be modified such as by performing one or more operations in a different order than that described, by omitting one or more operations, and/or by performing one or more additional operations. For example, referring to the process 400, in some examples the operations of blocks 402 and 404 may be performed after the operations of blocks 406 and 408. In another example, the operation of block 420 may be omitted entirely. Other examples are also possible.

In some embodiments, the base plate may have various numbers of anchor channels therein. While several of the base plates described herein are shown with two anchor channels, depending on application, the number of anchor channels in a single base plate may range from a single anchor channel to tens or even hundreds of anchor channels, depending on the size of the base plate and the size of the individual anchor channels. Further still, some examples may have multiple anchor channels that differ from one another (e.g., anchor channels on a single base plate may have different sizes, shapes, orientations, etc.).

In some embodiments, such as described in connection with FIGS. 6A-6D, anchor channels may extend through opening(s) in at least one sidewall of the base plate. Such a configuration may advantageously facilitate efficient removal of a completed object from the base plate by forcing the resin anchors within the anchor channels to move through the anchor channel and exit through the opening(s). In some cases, one or more of the anchor channels on a base plate may span an entire width/length of the build surface of the base plate and extend through openings in opposing sidewalls of the base plate. In such an example, a resin anchor can be extracted by applying force on the resin anchor through one of the base plate openings such that the resin anchor moves through the anchor channel and exits from the other of the base plate openings. To allow the resin anchors to slide through the anchor channels, the anchor channels may have a cross-sectional shape that does not decrease in size along the direction in which the resin anchor moves during extraction. For instance, the shape of the anchor channel may be constant along its length, or may increase monotonically in the direction that the resin anchor moves during extraction. By contrast, an anchor channel which becomes smaller/narrower when moving in a direction that a resin anchor moves during extraction may impede motion of the resin anchor (e.g., by the narrow portion pinching the resin anchor) and thereby prevent the resin anchor from being extracted.

Furthermore, for base plates with multiple anchor channels, the multiple anchor channels may be oriented with parallel lengths, such that each resin anchor in the anchor channels moves in a common direction through its respective anchor channel during extraction. However, the present disclosure is not in any way limited to such configurations that facilitate efficient extraction of the resin anchors from the anchor channels. In fact, some examples may include multiple anchor channels that do not extend through any sidewalls of the base plate. In such examples, detaching a completed object from the base plate may include severing the object from its resin anchors. For example, the base plate may include an integrated retractable blade, laser or other cutting implement that slices through cured resin in the openings of the anchor channels and thereby separates the object from the resin anchors. Other examples may involve separating a completed object from the base plate by applying enough force to deform the resin anchors within the anchor channels and thereby allow the resin anchors to exit the anchor channels.

Other examples are also possible in which a base plate includes at least one anchor channel that extends into the base plate from a build surface of the base plate.

V. Conclusion

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. A three-dimensional (3D) printer comprising:
a base plate comprising build surface having an anchor channel that extends from one sidewall of the base plate to an opposite sidewall of the base plate; and
one or more light sources that are configured to (i) emit light toward the build surface, and (ii) cure resin that is disposed within the anchor channel of the build surface of the base plate.

2. The 3D printer of claim 1, comprising:
a resin container configured to store the resin.

3. The 3D printer of claim 1, comprising:
an articulated robotic arm configured to submerge at least a portion of the base plate that includes the anchor channel into the resin.

4. The 3D printer of claim 1, wherein one or more of the light sources are configured to emit light toward the build surface through one of the sidewalls.

5. The 3D printer of claim 1, wherein the anchor channel comprises a T-shaped mortise.

6. The 3D printer of claim 1, wherein the one or more light sources are positioned within the base plate.

7. The 3D printer of claim 1, wherein the build surface comprises at least a second anchor channel that is separate from the anchor channel, and that also extends from the one sidewall to the opposite sidewall.

8. The 3D printer of claim 1, wherein the one or more light sources comprise a particular light source that emits light toward the anchor channel of the build surface only.

9. The 3D printer of claim 1, wherein the one or more light sources comprise a particular light source that emits light toward the entire build surface including the anchor channel.

10. The 3D printer of claim 1, wherein side walls of the anchor channel incorporate one or more reflective features.

11. A 3D printer comprising:
one or more computers and one or more storage devices storing instructions that are operable, when executed by the one or more computers, to cause the one or more computers to perform operations comprising:
exposing a base plate that comprises a build surface having an anchor channel that extends from one sidewall of the base plate to an opposite sidewall of the base plate, to resin; and
causing one or more light sources to emit light toward the build surface, thereby curing the resin that is disposed within the anchor channel of the build surface of the base plate.

12. The 3D printer of claim 11, wherein the operations comprise:
storing the resin in a resin container of the 3D printer.

13. The 3D printer of claim 11, wherein the operations comprise:
submerging at least a portion of the base plate that includes the anchor channel into the resin using an articulated robotic arm.

14. The 3D printer of claim 11, wherein one or more of the light sources are configured to emit light toward the build surface through one of the sidewalls.

15. The 3D printer of claim 11, wherein the anchor channel comprises a T-shaped mortise.

16. The 3D printer of claim 11, wherein the one or more light sources are positioned within the base plate.

17. The 3D printer of claim 11, wherein the build surface comprises at least a second anchor channel that is separate from the anchor channel, and that also extends from the one sidewall to the opposite sidewall.

18. The 3D printer of claim 11, wherein the one or more light sources comprise a particular light source that emits light toward the anchor channel of the build surface only.

19. The 3D printer of claim 11, wherein the one or more light sources comprise a particular light source that emits light toward the entire build surface including the anchor channel.

20. A method for manufacturing a 3D printer, comprising:
forming an anchor channel that extends from one sidewall of a build surface of a base plate that is associated with the 3D printer, to an opposite sidewall of the build surface of the base plate; and
positioning one or more light sources associated with the 3D printer for curing resin that is disposed within the anchor channel of the build surface of the base plate, to emit light toward the build surface.

* * * * *